United States Patent [19]
Vu et al.

[11] Patent Number: 5,439,711
[45] Date of Patent: Aug. 8, 1995

[54] METHOD FOR CO-REACTIVE EXTRUSION COATING OF PIPE USING THERMOSETTING MATERIAL

[75] Inventors: Cung Vu, Columbia, Md.; Matthew T. Pickett, Bognor Regis, England

[73] Assignee: W. R. Grace & Co.-Conn., New York, N.Y.

[21] Appl. No.: 264,829

[22] Filed: Jun. 23, 1994

[51] Int. Cl.$^6$ .............................................. B05D 1/18
[52] U.S. Cl. ............................ 427/430.1; 427/385.5; 427/388.1; 118/DIG. 11; 118/77; 264/209.2; 425/461; 425/462; 425/463; 425/464; 425/465; 425/466; 156/187; 156/195; 156/244.13
[58] Field of Search .............. 427/385.5, 388.1, 430.1; 118/DIG. 11, 77; 264/209.2; 425/461, 462, 463, 464, 465, 466; 156/187, 195, 244.13

[56] References Cited

U.S. PATENT DOCUMENTS

| | | | |
|---|---|---|---|
| 3,900,543 | 8/1975 | Davis | 264/45.3 |
| 3,988,097 | 10/1976 | Anders et al. | 425/461 |
| 4,259,137 | 3/1981 | Kemmerling | 156/244.13 |
| 4,464,082 | 8/1984 | Isaacs | 405/157 |
| 4,581,264 | 4/1986 | Emery et al. | 425/461 |
| 4,788,269 | 11/1988 | Vu et al. | 528/60 |
| 4,855,185 | 8/1989 | Vu et al. | 428/423.1 |
| 4,859,735 | 8/1989 | Vu | 524/780 |
| 4,877,829 | 10/1989 | Vu et al. | 524/729 |
| 5,158,727 | 10/1992 | Coleman-Kammula et al. | 264/109 |
| 5,290,632 | 3/1994 | Jadhav et al. | 427/385.5 |

FOREIGN PATENT DOCUMENTS

| | | |
|---|---|---|
| 0380163A2 | 8/1990 | European Pat. Off. . |
| 63303 | 5/1968 | Germany . |

OTHER PUBLICATIONS

Information page Entitled, "Fusion Bonded EPOXY" no date.
Information page Entitled, "PRITEC® Proven PE/-Butyl Corrosion Protection" no date.
Information page Entitled, "Extruded Coating" no date.
Information page Entitled, "SOMASTIC® Proven Asphalt Mastic Corrosion Pipe Coating" no date.
Information page Entitled, "Insulation Systems Insuline—Proven Polyurethane Foam Insulation—PRILO—K®" no date.
Information page Entitled, "HEVICOTE® Concrete Coating" no date.
Information page Entitled, "Specialty Coatings and Services" no date.

Primary Examiner—Shrive Beck
Assistant Examiner—David M. Maiorana
Attorney, Agent, or Firm—Craig K. Leon; William L. Baker

[57] ABSTRACT

The method of the invention for co-reactive slot die extrusion coating of elongated tubular articles, such as pipes, comprises the steps of extruding a two-component thermosetting material through a slot die that is comprised of low friction material and so configured as to permit the slot die to be rapidly opened for purposes of peeling gelled material from the die by hand. The method provides for substantially increased coverage rates and the use of interchangeable and reusable slot dies. In a preferred method, the extrusion step campuses the use of a slot die comprised of two blocks comprised of an acetal resin, and the blocks are clamped together and can be quickly unclamped to permit convenient removal of gelled thermoset material.

13 Claims, 4 Drawing Sheets

METHOD FOR CO-REACTIVE EXTRUSION COATING OF PIPE USING THERMOSETTING MATERIAL

BACKGROUND OF THE INVENTION

1. Field of the Invention

The present invention relates to corrosion protection of pipes, and more particularly to a method for coating pipes using a slot die for the co-reactive extrusion of a two-component thermosetting material.

2. Related Art

The use of tape and coating materials is generally known for protecting pipelines from corrosion. For example, thermoplastic tape or coating materials can be spirally or helically wrapped around the diameter of the pipe and sealed to enclose the outer surface. Large diameter pipes intended for subterranean installation can therefore introduce particular problems of their own due to their size and mass and because they must usually be corrosion-protected at the construction site. Typically, this is done using a laminate tape comprising a bituminous mastic adhesive on a thermoplastic film carrier. The tape can be applied using a spiral wrap (e.g., in the manner of a cigarette roll) or a helical wrap (e.g., in the manner of a tennis racket handle). The pipe is wrapped helically by moving a tape applicator at a predetermined rate linearly along the length of the pipe as it is being continuously rotated. Coating applications, which are similar to this helical wrapping method, employ a wide slit extrusion nozzle for extruding a thermoplastic material such as polyethylene onto the rotating pipe to seal its outer surface.

In contrast to thermoplastic materials, which are softened and usable as coating material upon heating, thermosetting materials are not typically favored for protecting pipe from corrosion. Thermosetting materials such as polyurethane have been applied to pipes in "stringy" bead form, but this provides a relatively slow coverage rate and introduces a number of inconveniences and risks especially on site. The material may, of course, "set up" or harden within the bead die or other extrusion equipment. Since it cannot be unhardened by the application of heat, the thermoset material must be chipped out to be removed, or the die nozzle other equipment must be replaced.

Thermosetting polyurethane has also been spray-coated onto large diameter pipes. However, this practice is inefficient because much, if not most, of the material sprayed does not coat the pipe and otherwise poses a health and environmental hazard.

Accordingly, the present invention provides a convenient and efficient method for slot die extrusion of a thermosetting coating material, avoiding the foregoing disadvantages while achieving an excellent coverage rate around elongated articles such as large diameter pipes.

SUMMARY OF THE INVENTION

The present invention provides a slot die extrusion method for coating an elongated tubular article, such as a pipe, using a two-component thermosetting is material. A preferred thermosetting material contemplated for use in the method comprises a two-component polyurethane formulation. In order to achieve a satisfactory coating coverage rate, the method of the invention employs a reusable slot (or slit) die. The slot die comprises a low-stick material such as polyacetal, polytetrafluoroethylene, or polypropylene which allows the thermosetting coating material to be extruded for an extended period of time and which allows any build-up of thermoset material to be peeled from the inner passageway of the die. Thus, an exemplary method of the invention comprises the steps of: providing two components which, when combined together, form a thermosetting material; combining the components to initiate a thermosetting reaction; and extruding onto a pipe the reacting components through a slot die having a body having an extrusion passageway in which the surfaces are comprised of low-stick material operative to permit the thermosetting extrudate material, when gelled, to be peeled from the inner passageway surfaces. In preferred extrusion steps, the slot die is comprised of at least two blocks defining therebetween an inner passageway surface comprised of material selected from the group consisting of an acetal resin, polytetrafluoroethylene, polypropylene, or a combination thereof, the at least two slot die blocks being releasably attached to each other, whereby the slot die can be dismantled and thermoset material can be removed front within the inner passageway surfaces.

DETAILED DESCRIPTION OF EMBODIMENTS

Figure 1:
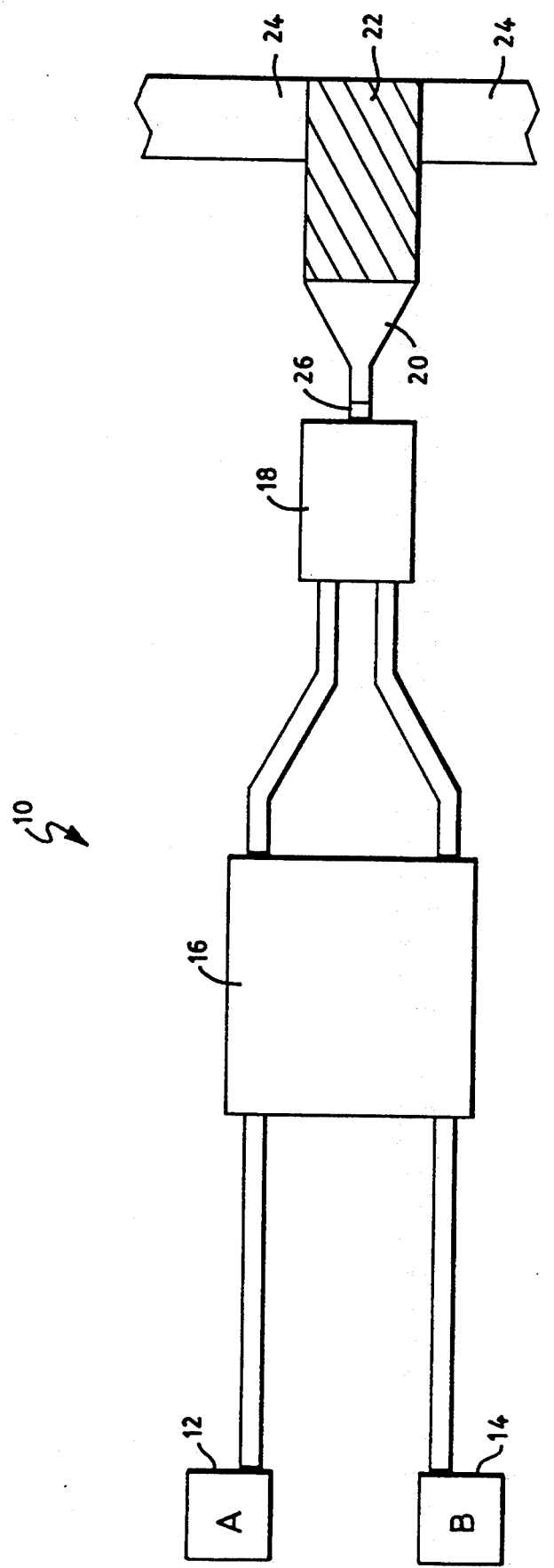
FIG. 1 is a schematic representation of a preferred method of the invention for slot-die extrusion of a pipe.

FIG. 1 schematically illustrates a preferred method 10 of the present invention for slot die extrusion coating of a pipe 24 or other elongate object with a thermosetting material 22. Two separate components, component A and component 13 (designated respectively as at 12 and 14), are combined such that a thermosetting reaction is initiated and the combined reacting components are extrudable through a slot die 20 in the form of a ribbon 22 which can either be wrapped spirally around a pipe 24 in the manner of a cigarette wrap, or preferably wrapped helically around the pipe 24 in the manner of a tennis racket handle grip.

In a preferred method, the thermoset material 22 is extruded onto and wrapped helically around the pipe 24 through the slot die 20 as the die 20 is moved lengthwise along the pipe 24 as the pipe is rotated. In prior art rotational casting methods, it is known to pour streams of reacting thermoset material such as polyurethane onto the traversing, rotating pipe in the manner of a continuous helical "string" bead. The present invention, however, provides a substantially increased coverage rate, by employing a specially designed slot die 20 which does not need to be thrown away when and if the extrudate thermoset materials hardens within the slot die 20.

Known two-component thermosetting materials are contemplated for use within the invention, such as epoxies, polyurethanes, and silicones. Polyurethanes are preferred. For example, component A can be a polyol component while component B can comprise an isocyanate component. Polyurethane formulations are disclosed as two-component systems, for example, by Cung Vu et al. in U.S. Pat. Nos. 4,788,269; 4,855,185; 4,859,735; and 4,877,829, all incorporated by reference herein. These are believed to be suitable for achieving the purposes of the present invention.

U.S. Pat. Nos. 4,788,269 and 4,855,185 of Vu et al. teach a thermosetting polyurethane prepared by mixing two components, A and B. component A comprises a low molecular weight polyol, e.g., glycerol; a poly(oxypropylene) triol; and an elastomer. Component B is a MDI, either a mix of 4,4'- and 2,4'-isomers of diphenylmethane diisocyanate or a mix of 4,4'- diphenylmethane diisocyanate and its reaction product with a low molecular weight poly(oxypropylene).

U.S. Pat. No. 4,859,735 of Vu teaches a polyurethane formulation in which component A comprises a castor oil modified with a ketone-formaldehyde condensate and also preferably containing an elastomer; and component B is a modified MDI. The MDI comprises a mixture of diphenylmethane diisocyanate and its reaction product with a low molecular weight poly(oxyalkylene).

U.S. Pat. No. 4,877,829 of Vu et al. teaches a polyurethane formulation wherein component A comprises a castor oil, a low molecular weight polyol having a molecular weight between 92 and about 200, preferably with an elastomer; and component B is a modified MDI, comprising either a mix of 4,4'- and 2,4'- isomers of diphenylmethane diisocyanate or a diphenylmethane diisocyanate and its reaction product with a low molecular weight poly(oxyalkylene).

In further exemplary methods of the invention, component A may comprise a castor oil and an elastomer preferably, but not necessarily, with functional groups such as hydroxyl, amino, active hydrogen, etc., capable of reacting with polyisocyanate, suitably an elastomeric diol. See e.g., U.S. Pat. No. 4,859,735 at Col. 5, lines 9 et seq. The elastomer can be one of the following: natural rubber, epoxidized natural rubber, ethylene-propylene rubber, nitrile rubber, styrene-butadiene rubber, acrylic elastomers, butyl rubber, chlorosulfonate polyethylene, neoprene, polybutadiene, polyisoprene, and the like. Polybutadienes, such as are available from Elf Autochem under the tradename Poly bd ®, are preferred. See U.S. Pat. No. 4,859,735 at Col 4, line 64–Col.5, line 5, incorporated herein.

The preferred two component poly-urethane formulations described above can be used with or without a catalyst and with or without an inhibitor. It is contemplated that known catalysts and/or inhibitors, such as are taught in the above-cited patents of Vu et al., are suitable for optional incorporation in the method herein. Polyurethane catalysts include tertiary amines, tin compounds, or other metal organics. Polyurethane inhibitors include organic and inorganic acids, such as benzoyl chloride, p-toluene sulfonic acid, formic acid, acetic acid, benzoic acid, phosphoric acid, hydrochloric acid, and the like.

Further exemplary methods of the invention involve the use of a proportioning pump 16 which meters components A and B in desired ratios. The metering pump 16 can be of either the piston or gear variety. Preferably, a mixer 18 is used in conjunction with the proportioning pump 16 to ensure that the thermosetting components 12 and 14 are sufficiently intermixed prior to extrusion 20 so as to initiate the thermosetting reaction and ensure a uniform result throughout the processed extrudate 22. Two-component metering and mixing systems are available for processing low to medium viscosity materials such as the preferred two-component polyurethane systems described herein.

It is believed that the amount and nature of catalyst used, if any, will be within the abilities of those ordinarily skilled in the art to ascertain without undue experimentation. Generally, this will depend upon the thermoset components chosen, the rate or rates of volume output of the proportioning pump 16, the volume throughput of the mixer 18, the residence time in the slot die 20, and similar factors. For the preferred two-component polyurethane systems which are to be extruded onto pipes, using about a 12 to 36 inch. wide slot die having a slot thickness of about 1–2 mm., the "pot life" of the mixed poly-urethane should be about 2 to 4 minutes. In other words, it is desirable to have the thermosetting material 22 harden to a point at which it can be handled by conventional pipe handling equipment within a few minutes after it 22 has been extrusion-wrapped onto the pipe 24. Yet, the thermosetting material should not be reacting so quickly that it gels within or prior to reaching the slot die 20 and poses blockage problems.

An exemplary method of the invention comprises the steps of providing components A and B which, when combined, form a thermosetting material; combining the components A and B to initiate a thermosetting reaction; and extruding onto a pipe the reacting combined components through a slot die 20 having a body comprised of at least two blocks forming therebetween an extrudate passageway having surfaces which are comprised of low-stick material. The slot die blocks can either be coated with a low-stick material, such as silicone, or, more preferably, the entire block piece can be fabricated out of the low-stick material. The use of the term "low-stick" herein means and refers to a material that is operative to permit the combined reacting components A and B to be unstuck or peeled by hand when the material is gelled (hardened) or is undergoing gelation.

Figure 3:
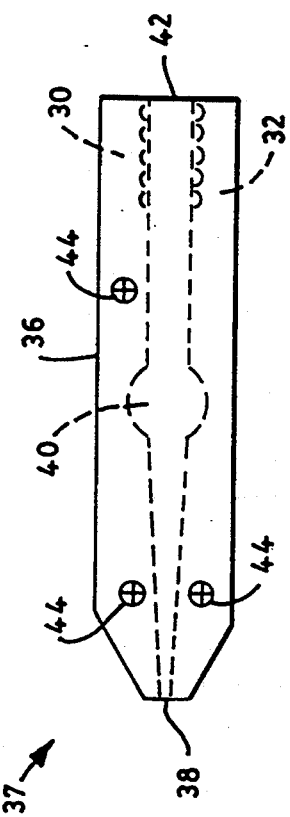
FIGS. 2, 3, 4 are separate front, side, and top views, respectively, of an exemplary slot die contemplated for use in methods of the invention.
Figure 2:
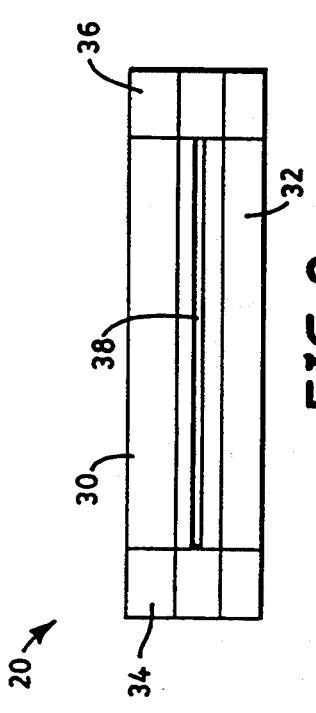
Figure 4:
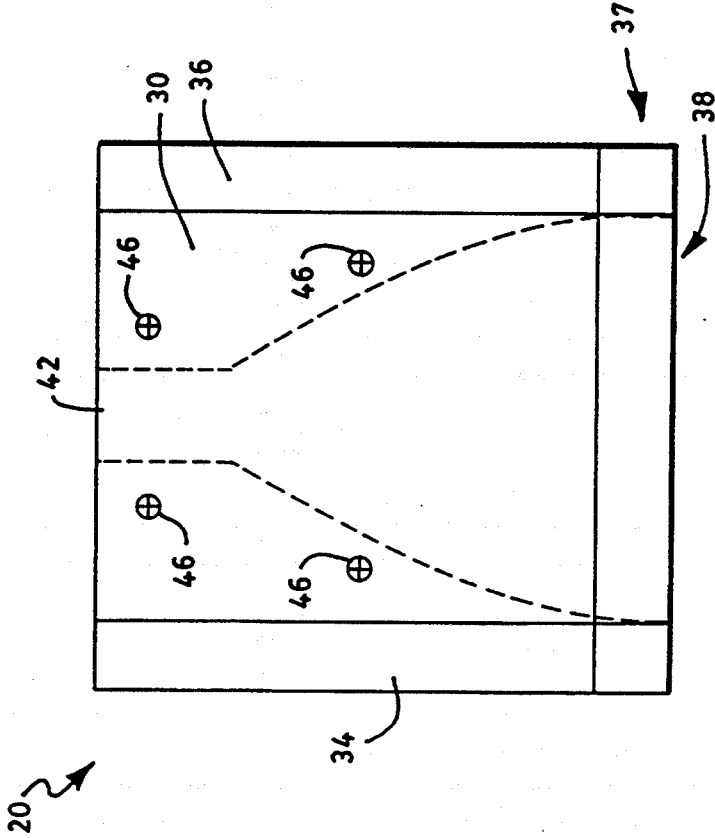

Various components of an exemplary slot die 20 used in further exemplary methods of the invention are shown from different perspectives in FIGS. 2 through 4. As shown in FIG. 2, the slot die 20 comprises a top block 30, bottom block 32, and side blocks 34 and 36 which define a die lip 37 and a slot-shaped extrusion opening or lip 38 through which a ribbon-shaped extrudate 22 can be passed (shown in FIG. 1 ). The side blocks 34 and 36, one of which is shown in the side perspective of FIG. 3, can, of course, be integral with either or both of the top 30 or bottom 32 blocks. As previously mentioned, preferred methods of the invention employ at least two die blocks 30 and 32 for defining therebetween a slot-shaped extrusion opening 38. The blocks define an inner flowthrough passageway 40, as shown in the side view of FIG. 3, the extrusion opening 38, and an inlet port 42 for accepting the combined thermoset components A and B from the mixer (42). The blocks 30 and 32 should preferably be comprised of low-stick material, such as an acetal resin, polytetrafluoroethylene, or polypropylene, such that gelled thermosetting material can be peeled from the inner surfaces of the die blocks. Acetal resins are preferred. An acetal resin is available from DuPont under the tradename DELRIN ®.

The use of exemplary slot die blocks of low-stick materials, such as an acetal resin, has a number of distinct advantages over steel and other metal dies. The initial material cost is much lower, such that the slot die is discardable without creating much financial grief. The plastic material can be conformed such as by machining to the desired die block shapes with far less labor. It also provides an increased advantage during usage in that it has much lighter weight and does not require mounting or supporting brackets which are otherwise required by comparatively heavier steel die assemblies. Although it may be possible to use a metal die coated with silicone within its passageways, the use of the die blocks comprised of solid low-stick material, such as an acetal resin, is much preferred.

An exemplary plastic slot die 20 block assembly can be held together by a minimum of bolts, as indicated in FIGS. 3 and 4, for releasably locking the side blocks to the top and bottom blocks (as shown at 44) or the top block to the bottom block (as shown at 46).

Figure 5:
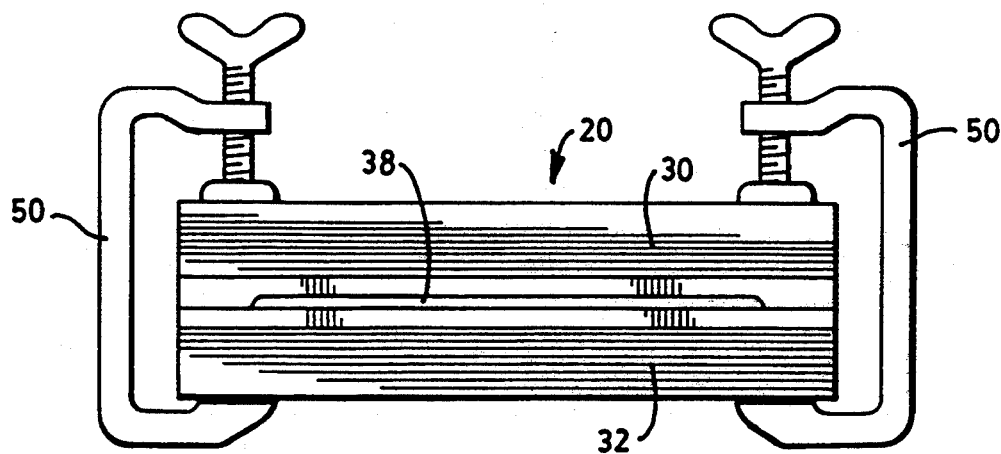
FIG. 5 is a front view of an exemplary slot die in which C-clamps are used for rapid opening of the die.
Figure 6:
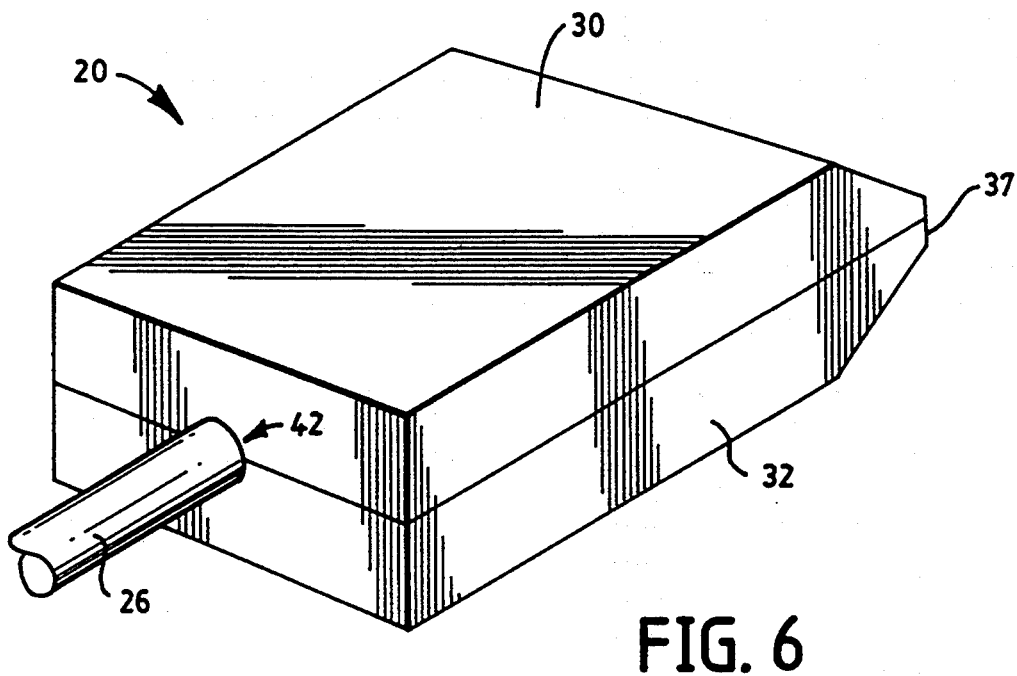
FIG. 6 is a back perspective view of an exemplary slot die (of FIG. 5 but without clamps)
Figure 7:
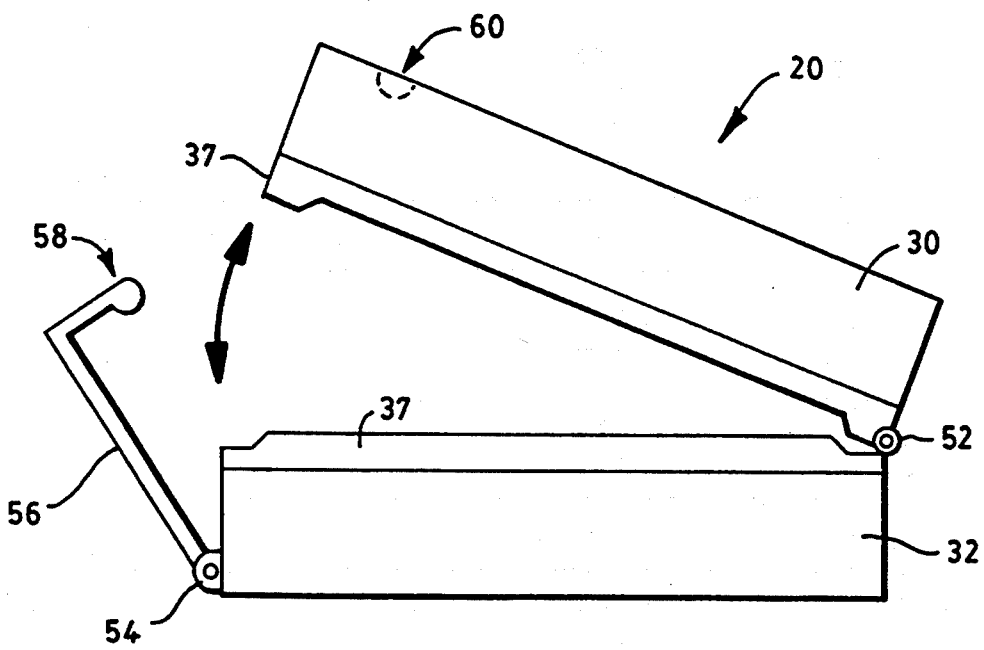
FIG. 7 is a front view of another exemplary slot die for use in methods of the invention.

In a preferable exemplary method of the invention, the extrusion step comprises a releasably clamped slot-die 20 assembly. FIG. 5 illustrates an exemplary slot die 20 block assembly in which a top block 30 and bottom block 32 are clamped together using "C-clamps" (50) which can be conveniently unclamped such that the slot die can be disassembled within seconds. FIG. 6 shows a rear perspective view of the slot die 20 blocks 30 and 32 (without clamps). The outlet port 26 from the mixer can be releasably connected to the inlet port 42 of the die 20 using corresponding screw-threads or an "O" ring and clamps.

In another exemplary method of the invention, the extrusion step may employ a slot die 20 having a top block 30 and bottom block 32 which are connected together by a hinge 52 to permit rapid access to the inner passageway defined between the blocks. The two blocks 30 and 32 can be clamped or otherwise releasably locked together by any known means. An exemplary clamp 56 is shown which is connected to one block by a clamp hinge 54 and conformed such as by having a clasp 58 so as to lockably engage with a détente (60) located in the other die block.

Further exemplary methods of the invention therefore comprise the further steps of removing gelled thermoset material from the slot die 20 block assembly by unclamping a first block 30 from a second block 32 and exposing the inlet port 42, slot die opening 38, and inner passageway 40 therebetween.

Known coating additives can be used in the thermosetting components such as thixotropic agents, antioxidants, UV stabilizers, pigments, surfactants, fillers, and the like.

The foregoing description and exemplary embodiments are provided for illustration only, and are not intended to limit the scope of the invention, since modifications may be apparent to those skilled in the art in view of the teachings herein.

It is claimed:

1. A method for coating a pipe, comprising the steps of:
introducing two thermoset components A and B each separately into a proportioning pump operative to meter said components in a ratio said components, when combined, operative to form a material selected from the group consisting of epoxy, polyurethane, and silicone;
providing a metering pump in conjunction with said proportioning pump to ensure that after metering said thermoset components A and B are sufficiently intermixed to initiate a thermosetting reaction;
extruding onto a continuously rotating pipe said intermixed reacting components through a slot die having a body comprised of at least two blocks defining therebetween inner passageway surfaces comprised of low-stick material operative to permit said reacting thermosetting components, when gelled and thermoset, to be removed therefrom, said blocks being releasably attached to each other whereby said slot die can be dismantled and thermoset material can be removed from within said inner passageway surfaces, and said extruded intermixed reacting components having a coating coverage rate for coating said continuously rotating pipe; and
advancing said slot die longitudinally along the length of said pipe while said pipe is rotated, whereby a ribbon of thermosetting material is helically coated around said pipe and is operative to protect said pipe against corrosion, 2. The method of claim 1 wherein said extrusion step further comprises the step of using a slot die comprised of at least two blocks defining therebetween an inner passageway, said blocks comprising material selected from the group consisting of an acetal resin, polytetrafluoroethylene, polypropylene, or a combination thereof, said at least two slot die blocks being releasably attached to each other, whereby said slot die can be dismantled and thermoset material can be removed from within said inner passageway surfaces.

3. The method of claim 1 wherein said low-stick material comprises silicone.

4. The method of claim 1 wherein said two components A and B are combined to form a thermosetting polyurethane.

5. The method of claim 1 wherein said mixer has a screw-threaded outlet port operative to feed said mixed components to said slot die, said slot die having a body which has an inlet port with threads corresponding to said mixer screw-threaded outlet port, whereby said slot die is threadably engageable with said mixer.

6. The method of claim 1 wherein said components A and B comprise a thermoset polyurethane mixture when mixed together, and said slot die comprises blocks which are fabricated out of polyacetal resin.

7. The method of claim 5 wherein, in said extrusion step, said slot die comprises a top block, a bottom block spaced apart from and generally coextensive with said top block, and two side blocks operative to position said top and bottom blocks a spaced-apart distance from each other, said top, bottom, and side blocks defining a slot-shaped extrusion part.

8. The method of claim 5 wherein, in said extrusion step, said slot die is comprised of two blocks which define therebetween an inlet port operative to accept thermosetting material from said mixer, a slot shaped die opening operative to extrude said thermosetting material, and an inner passageway communicating between said inlet port and die opening.

9. The method of claim 8 wherein said blocks are hinged together.

10. The method of claim 8 wherein said blocks are clamped together, and said method further comprises the step of unclamping said blocks and peeling said thermosetting material from an inner passageway of said die block.

11. A method for coating a pipe, comprising the steps of:
- introducing two thermoset components A and B separately into a proportioning pump operative to meter said components in a desired ratio, said components, when combined, operative to form a polyurethane;
- providing a metering pump in conjunction with said proportioning pump to ensure that after metering said thermoset components A and B are sufficiently intermixed to initiate a thermosetting reaction;
- extruding onto a continuously rotating pipe said intermixed reacting components through a slot die having a body comprised of at least two blocks defining therebetween inner passageway surfaces comprised of low-stick material operative to permit said reacting thermosetting components, when gelled, and thermoset, to be removed therefrom, said slot die blocks being releasably attached to each other whereby said slot die can be dismantled, and said at least two slot die blocks further being comprised of low-stick material, said extruded intermixed reacting components having a coating coverage rate for coating said continuously rotating pipe; and
- advancing said slot die longitudinally along the length of said pipe while said pipe is rotated, whereby a ribbon of reacting thermosetting polyurethane material is helically coated around said pipe.

12. The method of claim 11 wherein said at least two die blocks are releasably clamped together and operative thereby to be dismantled to permit removal of said thermosetting material from within inner passageway surfaces of said slot die.

13. The method of claim 11 wherein said die blocks are comprised of a low-stick material selected from the group consisting of a PFTE, a silicone, or an acetal, and said slot die is shaped by machining.

* * * * *